(12) United States Patent
Bitencourt Rangel Dantas et al.

(10) Patent No.: US 11,829,788 B2
(45) Date of Patent: Nov. 28, 2023

(54) TRACKING COMPUTER USER NAVIGATIONS TO GENERATE NEW NAVIGATION PATHS

(71) Applicant: International Business Machines Corporation, Armonk, NY (US)

(72) Inventors: Matheus Bitencourt Rangel Dantas, Rio de Janeiro (BR); Marcos Vinicius de Oliveira Ribeiro, Rio de Janeiro (BR); Claudio Santos de Souza Junior, Rio de Janeiro (BR); Marco Aurelio Stelmar Netto, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 17/457,471

(22) Filed: Dec. 3, 2021

(65) Prior Publication Data
US 2023/0176881 A1    Jun. 8, 2023

(51) Int. Cl.
*G06F 9/451* (2018.01)
*G06N 20/00* (2019.01)

(52) U.S. Cl.
CPC ............. *G06F 9/453* (2018.02); *G06N 20/00* (2019.01)

(58) Field of Classification Search
None
See application file for complete search history.

(56) References Cited

U.S. PATENT DOCUMENTS

| | | |
|---|---|---|
| 7,984,007 B2 | 7/2011 | Reumann |
| 8,893,212 B2 | 11/2014 | Reisman |
| 9,070,156 B2 | 6/2015 | Linden |
| 9,280,610 B2 | 3/2016 | Gruber |
| 9,633,674 B2 | 4/2017 | Sinha |
| 9,754,308 B2 | 9/2017 | Pinckney |
| 10,078,502 B2 * | 9/2018 | Prasad ............. G06N 5/047 |
| 10,706,841 B2 | 7/2020 | Gruber |
| 2005/0188423 A1 | 8/2005 | Motsinger |
| 2009/0171968 A1 | 7/2009 | Kane |
| 2014/0258855 A1 | 9/2014 | Mauro |
| 2017/0011308 A1 | 1/2017 | Sun |

(Continued)

FOREIGN PATENT DOCUMENTS

| | | |
|---|---|---|
| CN | 105068661 B | 9/2018 |
| EP | 3026565 B1 | 11/2018 |

OTHER PUBLICATIONS

"Quick Deployment, Instant Resolution", Avaamo, Downloaded from the Internet on May 28, 2021, 12 pgs., <https://avaamo.ai/solution-service-desk/>.

(Continued)

*Primary Examiner* — Craig C Dorais
(74) *Attorney, Agent, or Firm* — David B. Woycechowsky (57) ABSTRACT

When human users traverse physical space or traverse computer software, they take "navigational paths." Some embodiments of the present invention are directed to machine logic for identifying a favorable navigation paths by monitoring physical or computer software navigation paths used by human users as they use a set of computer program(s). This favorable navigation path, through physical space or the logic of the set of computer program(s), can then be suggested to future users who want to navigate from a similar starting point to a similar end point.

4 Claims, 5 Drawing Sheets

(56) References Cited

U.S. PATENT DOCUMENTS

2019/0026776 A1 1/2019 Campbell
2020/0293946 A1 9/2020 Sachan
2022/0398112 A1* 12/2022 Lu .......................... G06F 9/453

OTHER PUBLICATIONS

Disclosed Anonymously, "Method to Customize User Guide by Tracing Navigation Path", ip.com Prior Art Database Technical Disclosures, ip.com No. IPCOM000252445D, Feb. 7, 2018, 7 pgs.

Disclosed Anonymously, "Recommendation System For Root Cause Analysis with Machine Learning Based on Previous Customer Tickets & Defects", ip.com Prior Art Database Technical Disclosure, ip.com No. PCOM000261045D, Jan. 22, 2020, 6 pgs.

Herrouz, et al., "Navigation Assistance and Web Accessibility Helper", International Journal of Application or Innovation in Engineering and Management (IJAIEM), vol. 2, Issue 5, May 2013, 8 pgs.

* cited by examiner

TRACKING COMPUTER USER NAVIGATIONS TO GENERATE NEW NAVIGATION PATHS

BACKGROUND

The present invention relates generally to the field of providing "navigation" support for users of computer software.

It is known that users use computer programs. When they do this, they "navigate" through the computer program. That is the user makes various appropriate inputs in order to perform the data access operations and/or processing operations that the user wants to accomplish. For example, consider a user working on a text based document in a word processing program. The user wants to navigate through the process of saving the document that they are working on. The navigation path to do this might be as follows: (i) strike CONTROL-S keyboard combination one time; (ii) adjust default document title as desired in a "save window" using keyboard and mouse; and (iii) use the mouse to click an onscreen button located in the save window, which button is labelled SAVE.

It is further known that machine logic (for example, a bot constructed of software) can help a user find a navigation path that the user would like to follow. As of 4 Nov. 2021, the Wikipedia entry for "Office Assistant" states, in part, as follows: "The Office Assistant is a discontinued intelligent user interface for Microsoft Office that assisted users by way of an interactive animated character which interfaced with the Office help content . . . . The default assistant in the English version was named Clippit (commonly nicknamed Clippy), after a paperclip . . . . In July 2021, Microsoft [presented] a redesign of Clippit . . . and they then announced [resumption of use of redesigned Clippit]." (footnote(s) omitted) It is noted that Clippit is what is referred to in the art as a "front end" for providing the navigation help to users. User navigation help has been provided to users through other types of interfaces. This document does not deal in any detail with all the possible front ends that may be used, rather, it deals with navigation paths for computer users without regard to the front end that communicates the navigation help to the users.

Above, it was stated that software can provide user assistance in navigation through a "computer program." For purposes of this document, the "computer program," through which the computer user is navigating, could include several programs or other types of software pieces. For example, a navigational journey could include navigation through several independent websites using multiple different web browsers. In that example, the aggregate of the websites through which the user is navigating combined with the aggregate of the multiple browsers would be collectively considered as the "computer program" for purposes of this document.

Navigation through a set of computer programs is one type of navigation dealt with in this document. Another type of navigation is navigation through physical space, such as when a driver gets help navigating over roads with the help of a GPS (global positioning system) unit in the vehicle and a remote GPS server in wireless communication with the GPS unit in the vehicle. An example of a physical space navigation is as follows: drive west 6 miles on Phyllis Boulevard, then hang a left on Avon Court and stop at the third house on the right, the one with the green light over its front porch.

SUMMARY

According to an aspect of the present invention, there is a method, computer program product and/or system for use with a set of computer program(s) that is used by human users who provide inputs to perform computer software navigations through the set of computer program(s) that performs the following operations (not necessarily in the following order): (i) receiving a computer software navigational objective data set that includes information indicative of a start point for a computer software navigation path and an end point for the computer software navigation path; (ii) receiving a user computer software navigation journeys data set that includes information indicative of a plurality of monitored computer software navigation paths taken by human users while using the set of computer program(s), with each monitored computer software navigation path beginning at the start point and ending at the endpoint; and (ii) determining, by machine logic and from the plurality of monitored software navigational paths, a favorable computer software navigational path for navigating through the set of computer program(s) from the start point to the endpoint.

According to an aspect of the present invention, there is a method, computer program product and/or system for use with a physical space that is used by human users who traverse the physical space in various ways that performs the following operations (not necessarily in the following order): (i) receiving a spatial navigational objective data set that includes information indicative of a start point for a spatial navigation path and an end point for the spatial navigation path; (ii) receiving a user spatial navigation journeys data set that includes information indicative of a plurality of monitored spatial navigation paths taken by human users while using the set of computer program(s), with each monitored spatial navigation path beginning at the start point and ending at the endpoint; and (iii) determining, by machine logic and from the plurality of monitored spatial navigational paths, a favorable spatial navigational path for navigating through the set of computer program(s) from the start point to the endpoint.

According to an aspect of the present invention, there is a method, computer program product and/or system for use with by human users who are navigating real space and/or computer program(s) that performs the following operations (not necessarily in the following order): (i) receiving a navigational objective data set that includes information indicative of a start point for a navigation path and an end point for the navigation path; (ii) receiving a user navigation journeys data set that includes information indicative of a plurality of monitored navigation paths taken by human users while using the set of computer program(s), with each monitored navigation path beginning at the start point and ending at the endpoint; and (iii) determining, by machine logic and from the plurality of monitored navigational paths, a favorable navigational path for navigating through the set of computer program(s) from the start point to the endpoint.

DETAILED DESCRIPTION

Some embodiments of the present invention are directed to machine logic for discovering computer user navigation paths for accomplishing data accessing, saving and/or processing operations on a computer by a human user. In some embodiments, the machine logic for computer user navigation path discovery considers a series of factors, including: (i) a comparison of the task to be accomplished; (ii) a history of successful tasks executed; and (iii) weighted directed graph. The weighted directed graph compares the execution steps, auto-training assistant using similarity of navigable execution steps and ticket generation monitoring system. This can save manual effort by human computer workers in the generation, exposure, dissemination and/or publication alternative paths by replacing that effort with intelligent software. In computer software navigation path embodiments, the use of the machine logic of the present invention can make for a more economically efficient ticketing system because lightweight tickets or a small number of tickets will not auto-generate alternative paths and publish those to the user at moments where a failure in detected in his/her activity to be accomplish. Certain failures may generate too much new workload to the development team that either they fix the failure or a system, but some embodiments of the present invention discover new navigation paths (for example, navigation paths through physical space, computer software navigation paths). This helps users to accomplish the same or similar task based on what others have done.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
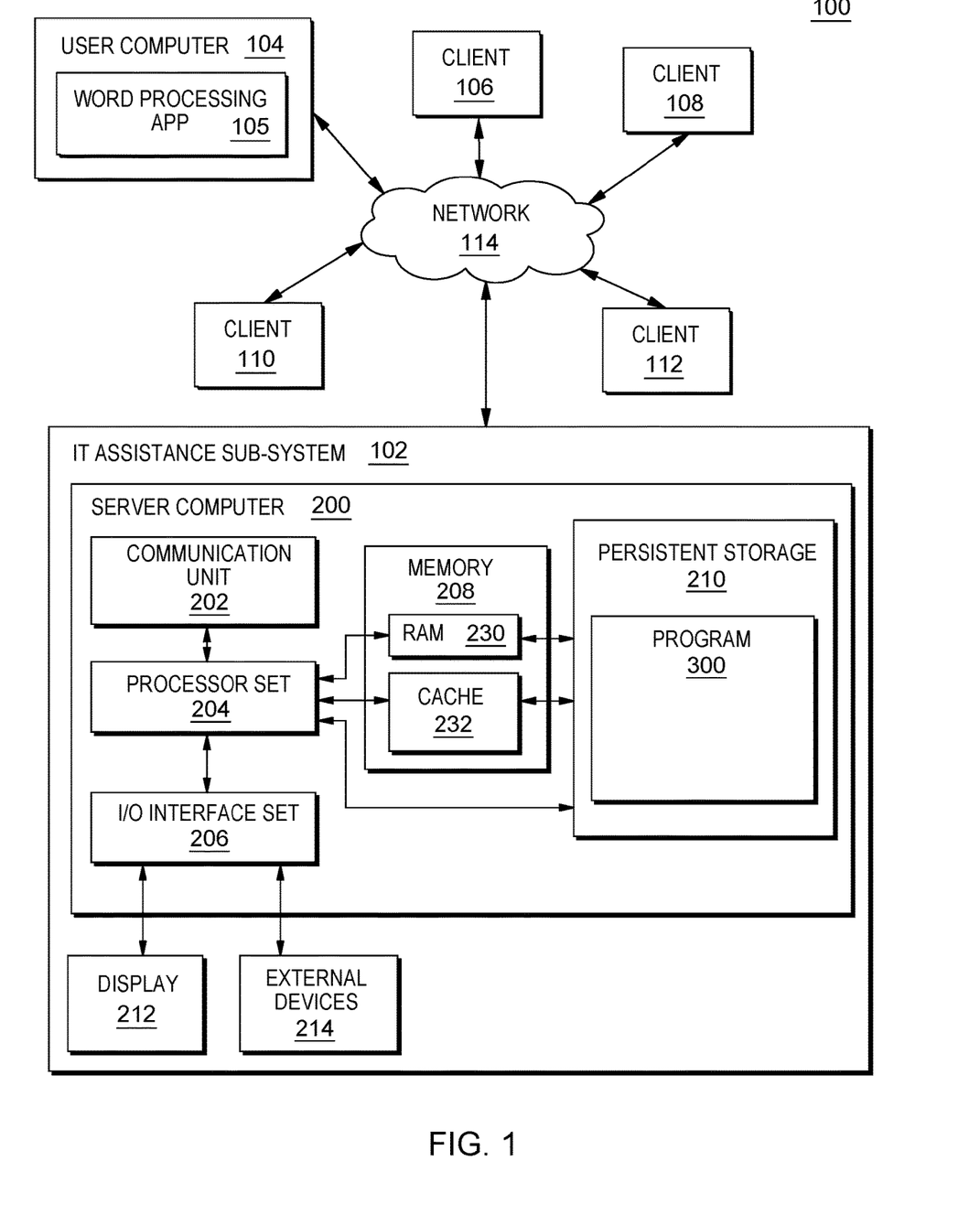
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: IT (information technology) assistance subsystem 102 (sometimes herein referred to, more simply, as subsystem 102); user computer 104; word processing app 105; client subsystems 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
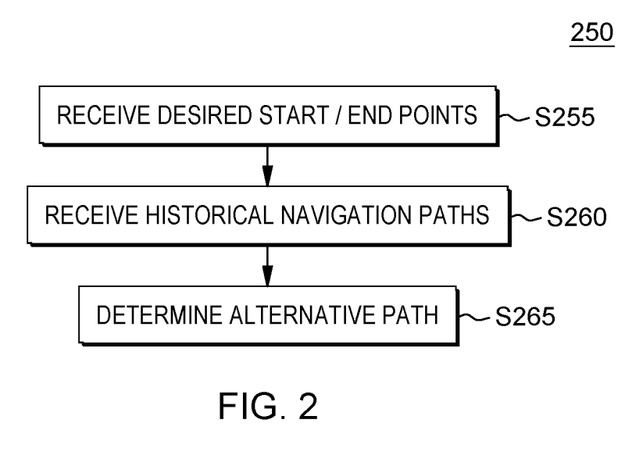
FIG. 2 is a flowchart showing a first embodiment method performed, at least in part, by the first embodiment system.
Figure 3:
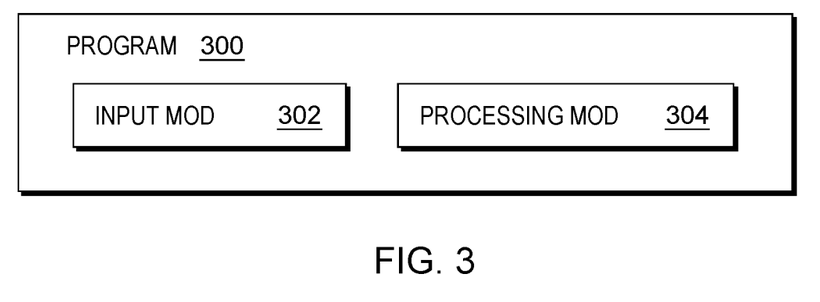
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

The method of flowchart 250 is a computer-implemented method (CIM) for use with a set of computer program(s) that is used by human users who provide inputs to perform computer software navigations through the set of computer program(s). Alternatively, the navigational paths may be paths of human users who navigate real, physical spaces (for example, a set of roads within a county). In the example of flowchart 250, the human user is navigating a computer program in the form of word processing app 105 running on user computer 104.

Figure 4:
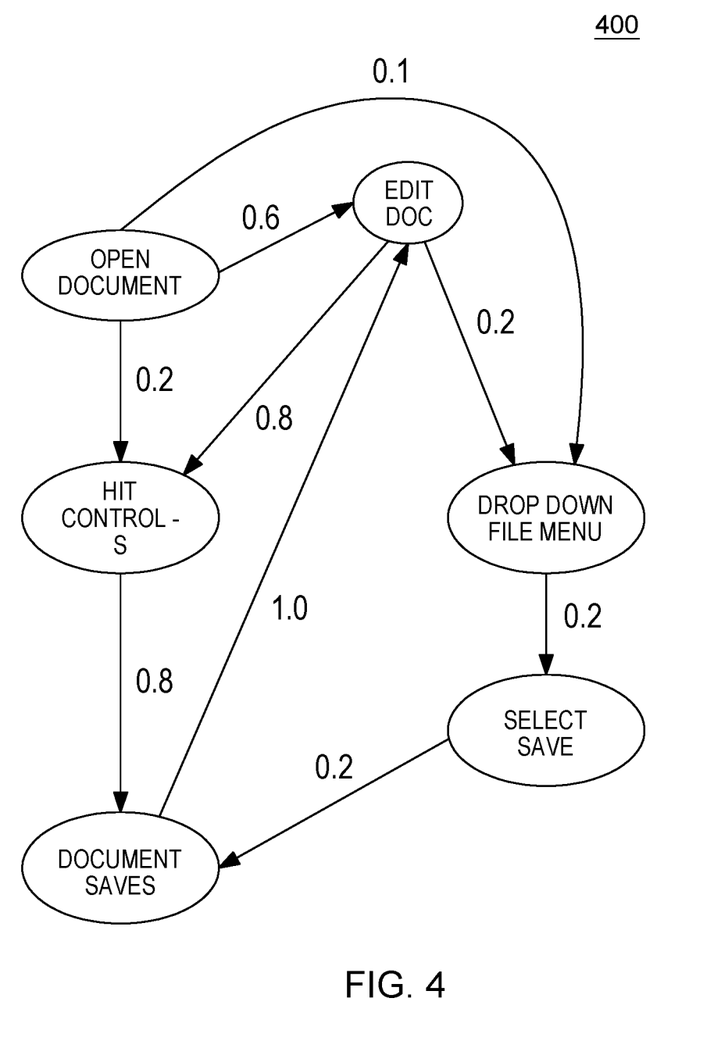
FIG. 4 is a directed weighted graph generated by the first embodiment system.

Processing begins at operation S255, where input module ("mod") 302 receives a computer software navigational objective data set from user computer 104 and through network 114 includes information indicative of a start point for a computer software navigation path and an end point for the computer software navigation path. In this example, the current status of the user's interaction with the word processing app is: edit doc status, meaning that the computer program is waiting for the human to make edits to an open word processing document in the word processing application. This is the start point of a navigation in which the human user wants to engage. The desired endpoint is the saving of the document. This start point and endpoint are shown as nodes in the directed weighted graph data structure 400, as shown in FIG. 4. In this example, the CONTROL key on the user's keyboard is broken. Because the user normally saves word processing documents using the CONTROL-S keyboard combination, the user is unable to save their document. This path, which the user is unable to use due to the broken keyboard, is shown in graph 400 and traverses through the HIT CONTROL-S node to the DOCUMENT SAVES node. The human user desires an alternative path to save their open word processing document.

Processing proceeds to S260, where mod 302 receives a user computer software navigation journeys data set that includes information indicative of a plurality of monitored computer software navigation paths taken by human users while using the set of computer program(s), with each monitored computer software navigation path beginning at the start point and ending at the endpoint. These monitored, historical navigation paths are received from various client subsystems 106, 108, 110 and 112 in this example.

Processing proceeds to operation S265, where processing mod 304 determines, by machine logic and from the plurality of monitored software navigational paths, a favorable computer software navigational path for navigating through the set of computer program(s) from the start point to the endpoint. The human user desires an alternative path to save their open word processing document.

After the favorable navigational path has been discovered, it may be exposed, communicated to human users in various ways, such as by virtual assistant, live internet chat, email, through a GPS unit interface and so on. In this example, the alternative path is communicated to the user as sound through their headphones (not shown). This alternative path is shown in graph 400 and traverses through the DROP DOWN FILE MENU node to the SELECT SAVE node. The user can now save their document, notwithstanding the broken control key because other users have performed this navigational journey in the past, while being monitored, and further because this data has been structured so that alternative paths may be discovered, for example, by use of directed weighted graph 400. The numbers listed for each edge of graph 400 indicates a weight for that edge. The arrows on graph 400 indicate directionality. In various embodiments, edges can by single direction or two way.

III. Further Comments and/or Embodiments

Some embodiments of the present invention recognize the following facts, potential problems and/or potential areas for improvement with respect to the current state of the art: (i) sometimes there is a high volume of ticket generation associated with helping computer users with navigation;

and/or (ii) high volume is likelier to occur when users are not able to accomplish a task in a web or mobile application (that is, the users have what is herein referred to as a "computer navigation problem," or, more simply, a "navigation problem").

Some embodiments of the present invention may include one, or more, of the following operations, features, characteristics and/or advantages: (i) provides a solution to guide users on performing activities following a set of steps that are validated by other users; (ii) keeps users using the running system while developers focus on higher priority activities; (iii) is particularly relevant in the creation of MVPs (minimum viable product) or quick proof of concept type projects; (iv) includes a user guiding system to suggest steps that are currently working for systems under development; (v) the system relies on recording of user steps accessing a system and creating a knowledge graph on sets of steps that can be followed or not; (vi) the graph can have weights to assess steps that may succeed or fail; (vii) sequences of navigable steps can be clustered using unsupervised machine learning; and/or (viii) determines which navigation steps generate or do not generate an error (ticket generation) with supervised machine learning.

Some embodiments of the present invention may include one, or more, of the following operations, features, characteristics and/or advantages: (i) helps the user in real time with a best path to follow based on user patterns; (ii) focuses on error issues; (iii) avoids a user's unfavorable experience(s) and creation of tickets; (iv) detects error requests derived from the user; (v) performs error analysis; (vi) stores errors as they are encountered during a user's use of the subject computer system; (vii) includes a system that performs the tasks; (viii) provides other options from the error stored; (ix) provides information to other users about those errors; (x) learns from other users; (xi) saves other failure requests; and/or (xii) uses a graph approach to track user navigation.

Some embodiments of the present invention may include one, or more, of the following operations, features, characteristics and/or advantages: (i) includes a user guiding system to suggest steps that are currently working for systems under development; (ii) the system relies on recording of user steps, accessing a system and creating a knowledge graph on sets of steps that can be followed or not; (iii) the graph can have weights to assess steps that may succeed or fail; (iv) the graph is automatically created using unsupervised machine learning to cluster common sequences of navigation steps and unsupervised learning to consider which sequences of steps to generate or not generate a ticket (error); and/or (v) reduces the number of tickets and user experiences with a system that is under development or a system which is unstable.

Figure 5:
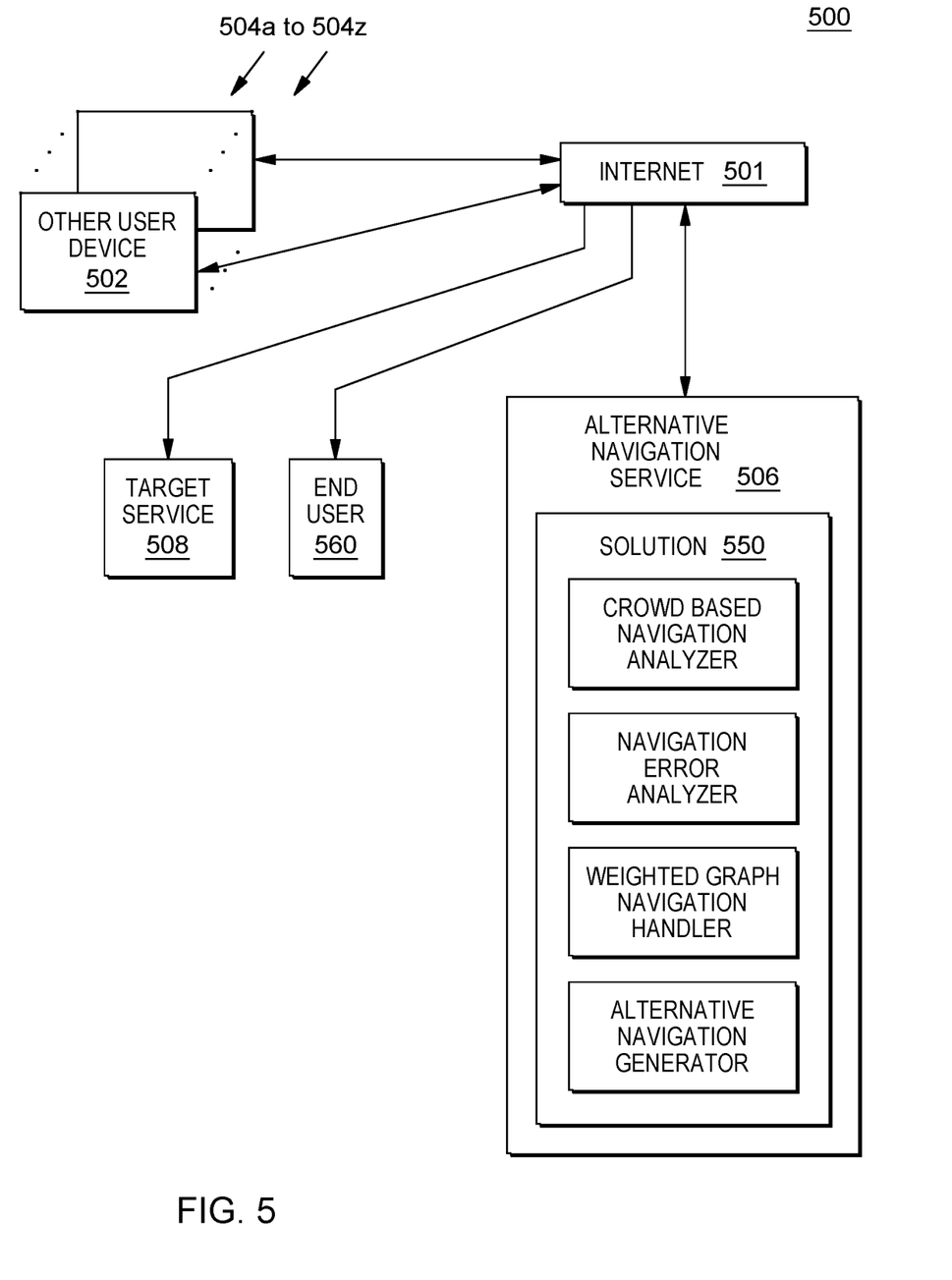
FIG. 5 is a block diagram of a second embodiment of a system according to the present invention.

As shown in FIG. 5, system diagram 500 includes: internet 501; other user device 502; data files 504a to 504z; alternative navigation service 506; target service 508; solution 550; and end user 560.

Figure 6:
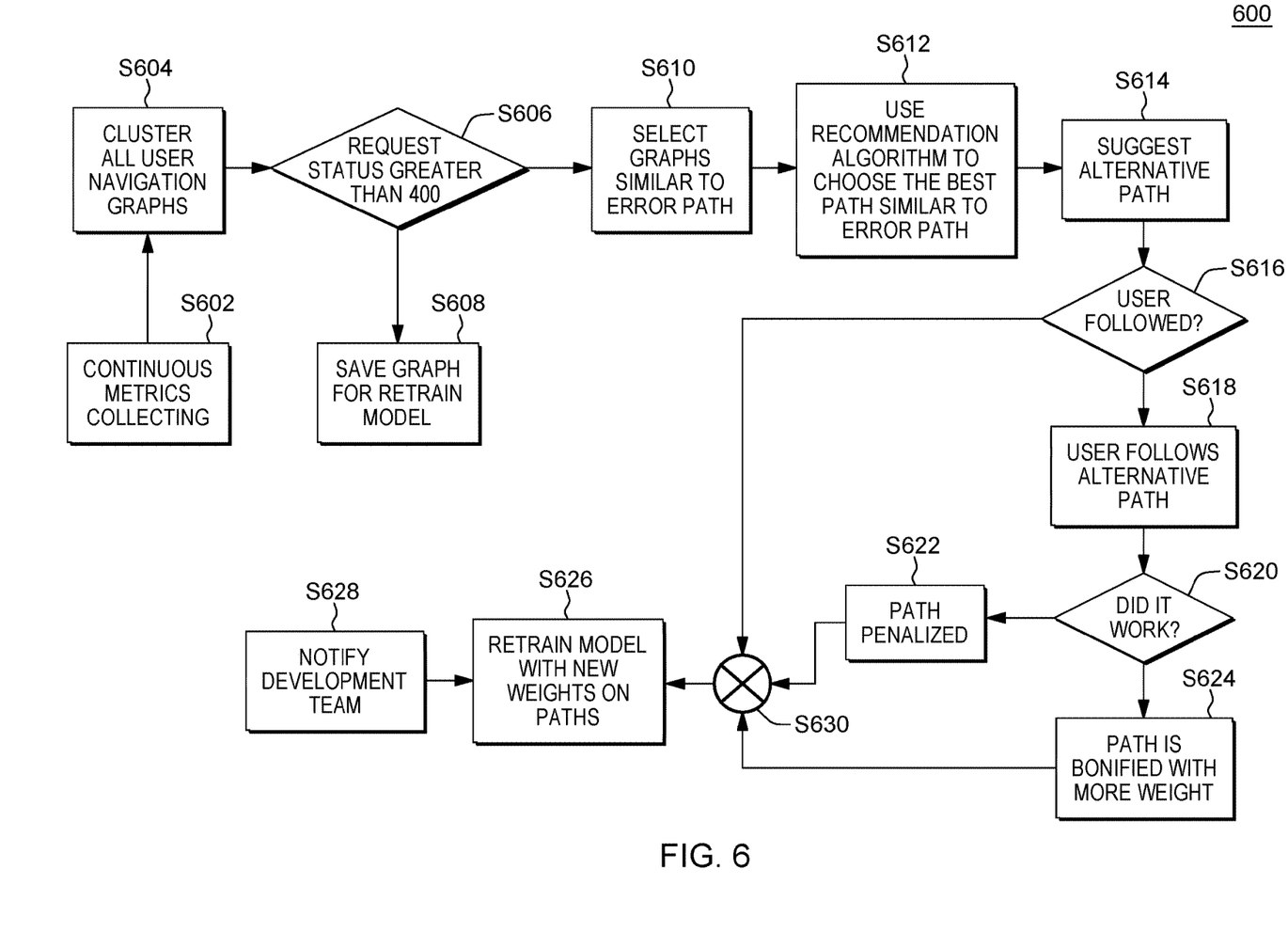
FIG. 6 is a flowchart showing a second embodiment of a method according to the present invention.

As shown in FIG. 6, flowchart 600 includes: continuous metrics collecting block S602; cluster aa user navigation graphs block S604; request status greater than 400 block S606; save graph for retrain model block S608; select graphs similar to error path block S610; use recommendation algorithm to chose the best path similar to error path block S612; suggest alternative path block S614; user followed? block S616; user follows alternative path block S618; did it work? block S620; path penalized block S622; path is bonified with more weight block S624; retrain model with new weights on paths block S626; notify development team block S628; and junction block S630.

A method according to an embodiment of the present invention includes the following operation (refer to FIG. 6, operation S602). Continuous metrics collecting—Gathering of information about user actions, data from requests, the user location within the application and what the user was doing before a request to the application was made (clicks and information entered by the user). All this information is stored for further enhancement. This operation assumes the model has already been generated. This model might be an unsupervised machine learning model such as k-means that is able to cluster weighted directed graphs.

Additionally, a method according to an embodiment of the present invention includes the following operation (refer to FIG. 6, operation S604). Cluster all user navigation graphs—Cluster all the information gathered in forms of graphs and store it for the model training. The graphs have its vertices (nodes) representing the information entered by the user and the information gathered before the request was made, and the edge (lines) receives the user location within the application. The path ends when there is a response from the application.

Additionally, a method according to an embodiment of the present invention includes the following operation (refer to FIG. 6, operation S606). Request status greater than 400—After a request is made by the user, the response status is checked to see if there were some errors in the request. Every status response that is equal to or greater than 400 returned an error, and it indicates if it was something with the request handler in the application (below 500) or something with the server hosting the application (equals or above 500). This successful path has its weight increased in order to be chosen as the recommended path with high probability.

Additionally, a method according to an embodiment of the present invention includes the following operation (refer to FIG. 6, operation S608). Save graph for retrain model—If the response status returned a successful message, the graph receives a positive weight because it was a successful path, and it can be further recommended. This operation performs an algorithm such as cosine similarity to classify graph similarity in the cluster that the graph belongs.

Additionally, a method according to an embodiment of the present invention includes the following operation (refer to FIG. 6, operation S610). Select graphs similar to error path—If there were some errors made on the request, similar graphs to the one sent are selected and verified if any of these are successful paths. All the successful paths encountered are selected to be sent to the recommendation algorithm in order to choose the best alternative path to the user. This operation requires a recommendation algorithm for weighted directed graphs that uses the adjacency matrix to find the new path to be followed.

Additionally, a method according to an embodiment of the present invention includes the following operation (refer to FIG. 6, operation S612). Use recommendation algorithm to choose the best path similar to error path—Based on the set of successful graphs that has been found from operation S610, a recommendation algorithm is performed in order to find the best navigation graph to be suggested to the user.

Additionally, a method according to an embodiment of the present invention includes the following operation (refer to FIG. 6, operation S614). Suggest alternative path—As the new navigation graph is found, the system uses a virtual assistant to interactively guide the user to follow the successful path. This virtual assistant will help the user with the intent of decreasing the number of support tickets created and improve the user experience, as the user has a real time response to guide you to finish your request. Here supervised machine learning can be used in which a sequence of operations can be featured, and the generation of the ticket, due to an error, could be the label.

Additionally, a method according to an embodiment of the present invention includes the following operation (refer to FIG. 6, operation S616). User Followed?—Checks (using the same method of the operation S602 above) whether the user followed or not followed the path suggested in order to understand if it would be a successful suggestion with the goal to increase or not increase this specific path in the graph.

Additionally, a method according to an embodiment of the present invention includes the following operation (refer to FIG. 6, operation S618). User Follows alternative path—If the user followed the alternative path suggested, the system will store the information that the user has followed the suggested path and continue to monitor the trajectory made, with the objective of verifying whether that path was satisfactory or not, using the same metrics as the initial operation S602 above.

Additionally, a method according to an embodiment of the present invention includes the following operation (refer to FIG. 6, operation S620). Did it work?—At the end, it will be verified if the proposed alternative path did, in fact, work using the same method of operation S606 above.

Additionally, a method according to an embodiment of the present invention includes the following operation (refer to FIG. 6, operation S622). Path penalized—If the alternative path did not work, then this path gets penalized and weight is subtracted from the graph used by this path, in order to rebalance it.

Additionally, a method according to an embodiment of the present invention includes the following operation (refer to FIG. 6, operation S624). Path is bonified with more weight—If the alternative path worked, then this path gets bonified and more weight is assigned to the graph used by this path, in order to guarantee further usage.

Additionally, a method according to an embodiment of the present invention includes the following operation (refer to FIG. 6, operation S626). Retrain model with new weight—The system will retrain the model with the new path weights in order to get more insights and rebalance the graphs. This operation is important to keep the model updated and to ensure the paths with more weights are the best ones to suggest.

Additionally, a method according to an embodiment of the present invention includes the following operation (refer to FIG. 6, operation S628). Notify development team—The development team is notified of the error with their respective collected metrics, in order to assist so that the correction occurs in a faster and more accurate way. With it, the development team can continue to focus on prioritized issues and have more time to fix it.

A method according to an embodiment of the present invention for creating alternative valid service navigation steps includes the following operations (not necessarily in the following order): (i) in response to collecting metrics associated with usage information including: (a) user actions, (b) data from requests, (c) a location of the user within an application and what the user was doing before a request to the application was made, and (d) storing collected information; (ii) clustering the collected information to form graphs having vertices (nodes): (a) representing the collected information entered by the user, (b) representing collected information gathered before the request was made, and (c) includes edge lines that receives the user location within the application; (iii) storing the graphs for model training; (iv) in response to receiving a request by the user, determining whether a response status is at least equal to a predetermined threshold value; and (v) in response to a determination that the response status exceeds the predetermined threshold value, indicating an error response.

A method according to an embodiment of the present invention for creating alternative valid service navigation steps further includes the following operations (not necessarily in the following order): (i) in response to a determination the response status is less than the predetermined threshold value, indicating a positive response; (ii) in response to indicating the positive response, assigning a positive weight to a respective graph; (iii) in response to indicating the error response, for each identified similar graph to a current graph of the error response, verifying whether any identified similar graph is a successful path; (iv) in response to sending all successful paths encountered to a predetermined recommendation algorithm, identifying by the predetermined recommendation algorithm using respective assigned weight values, a navigation graph with a highest weight to suggest to the user; and (v) interactively guiding the user, using a virtual assistant to follow a successful path of the navigation graph suggested as an alternative path.

A method according to an embodiment of the present invention for creating alternative valid service navigation steps further includes the following operations (not necessarily in the following order): (i) in response to a determination the user followed the alternative path, storing information indicating the user followed the alternative path while continuing to monitor a trajectory made; (ii) in response to a determination the alternative path did work, adding a predetermined weight to a respective graph used by this alternative path; (iii) marking this alternative path to guarantee further usage; (iv) in response to a determination that the alternative path did not work, subtracting a predetermined weight from the respective graph used by this alternative path; (v) retraining the model using new path weights to enable new insights and rebalance respective graphs; and (vi) notifying respective developers of an error with respective collected metrics.

Some embodiments of the present invention may include one, or more, of the following operations, features, characteristics and/or advantages: (i) prevents users opening tickets due to a system problem; (ii) guides users by providing navigation steps that are currently working for systems under development (or systems under some functionality problem); (iii) relies on recording of user steps accessing a system and creating a knowledge graph on sets of steps that can be followed or not; (iv) the graph can have weights to assess steps that may succeed or fail; (v) sequences of navigable steps can be clustered using an unsupervised machine learning; (vi) determines which navigation steps generate an error or do not generate an error (ticket generation) with supervised machine learning; (vii) prevents or reduces considerably the generation of tickets due to a service/system malfunction; (viii) provides a better user experience through possible navigable steps within a system/service; (ix) focuses on monitoring user's requests to prevent them generating tickets due to a system problem; and/or (x) prevents the user opening tickets when an error occurs when the user makes a request.

Some embodiments of the present invention may include a user guidance service in the context of a user needing help to move physically around (via roads, pathways) based on geo properties, traffic, weather, and the like. Some embodiments help users execute a set of steps in a software system under failure, at certain steps, that generates additional workload due to failures.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) for use with a set of computer program(s) that is used by human users who provide inputs to perform computer software navigations through the set of computer program(s), the CIM comprises:
   receiving a computer software navigational objective data set that includes information indicative of a start point for a computer software navigation path and an end point for the computer software navigation path;
   receiving a user computer software navigation journeys data set that includes information indicative of a plurality of monitored computer software navigation paths taken by human users while using the set of computer program(s), with each monitored computer software navigation path beginning at the start point and ending at the endpoint; and
   determining, by machine logic and from the plurality of monitored software navigational paths, a favorable computer software navigational path for navigating through the set of computer program(s) from the start point to the endpoint;
   wherein the determining of a favorable computer software navigational path includes:
   making a weighted directed graph; and
   comparing execution steps to auto-train an assistant using similarity of navigable execution steps and ticket generation monitoring system.

2. A computer-implemented method (CIM) for use with a set of computer program(s) that is used by human users who provide inputs to perform computer software navigations through the set of computer program(s), the CIM comprises:
   receiving a computer software navigational objective data set that includes information indicative of a start point for a computer software navigation path and an end point for the computer software navigation path;
   receiving a user computer software navigation journeys data set that includes information indicative of a plurality of monitored computer software navigation paths taken by human users while using the set of computer program(s), with each monitored computer software navigation path beginning at the start point and ending at the endpoint; and
   determining, by machine logic and from the plurality of monitored software navigational paths, a favorable computer software navigational path for navigating through the set of computer program(s) from the start point to the endpoint;
   wherein the determining of a favorable computer software navigational path further comprises:
   making a weighted directed graph; representing the information entered by a user as a plurality of nodes in the weighted directed graph;
   representing information gathered before a request was made as nodes in the weighted directed graph; and
   representing user locations as edges in the weighted directed graph.

3. A computer-implemented method (CIM) for use with a set of computer program(s) that is used by human users who provide inputs to perform computer software navigations through the set of computer program(s), the CIM comprises:
   receiving a computer software navigational objective data set that includes information indicative of a start point for a computer software navigation path and an end point for the computer software navigation path;
   receiving a user computer software navigation journeys data set that includes information indicative of a plurality of monitored computer software navigation paths taken by human users while using the set of computer program(s), with each monitored computer software navigation path beginning at the start point and ending at the endpoint;
   determining, by machine logic and from the plurality of monitored software navigational paths, a favorable computer software navigational path for navigating through the set of computer program(s) from the start point to the endpoint; and
   performing unsupervised machine learning model using a KMeans algorithm to cluster weighted directed graphs.

4. The CIM of claim 3 further comprising:
   cluster a plurality of navigation graphs to obtain a plurality of clusters; and
   performing model training using the plurality of clusters.

* * * * *